Figure 5:
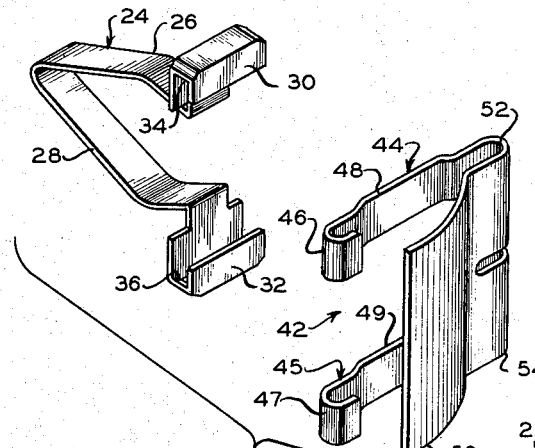

Nov. 24, 1953 — C. D. WEST — 2,659,950
TRIM MOLDING FASTENING MEANS AND METHOD
Filed Aug. 14, 1950 — 3 Sheets-Sheet 1
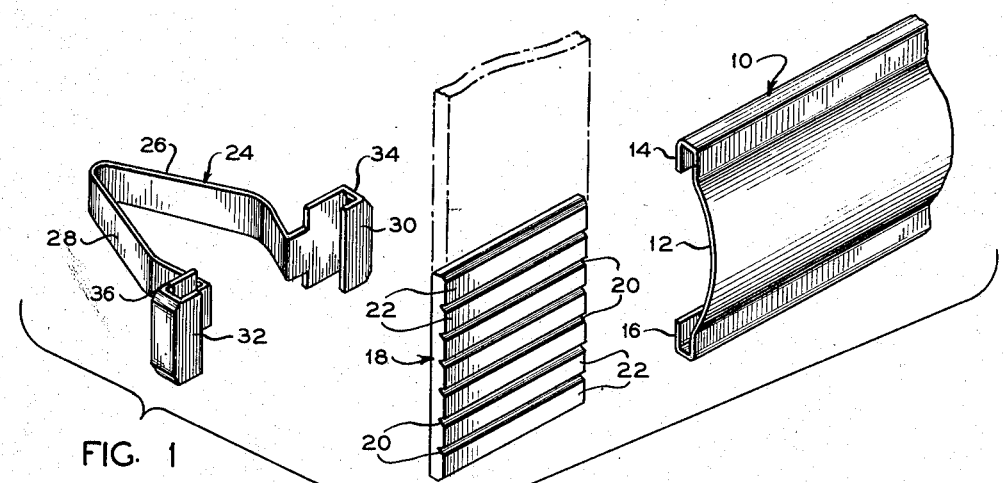
FIG. 1
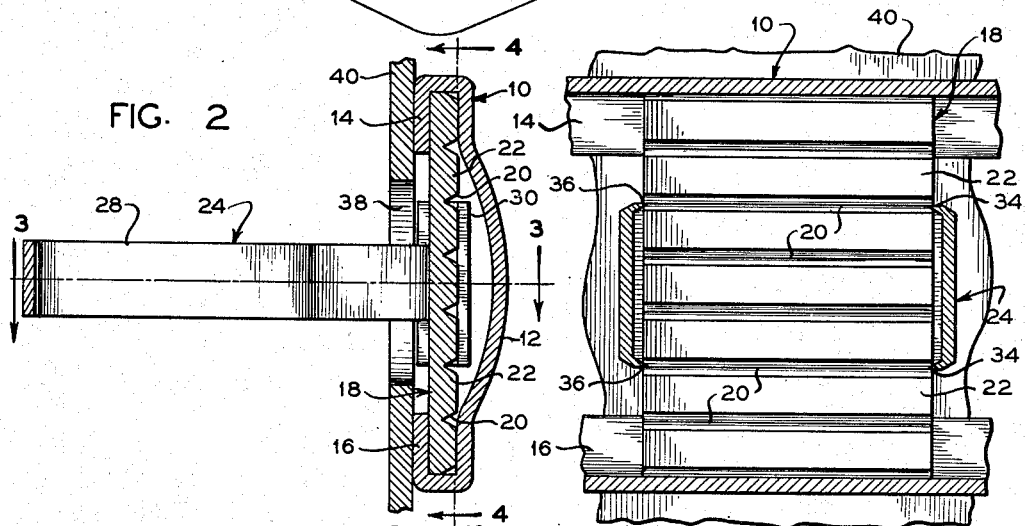
FIG. 2
FIG. 4
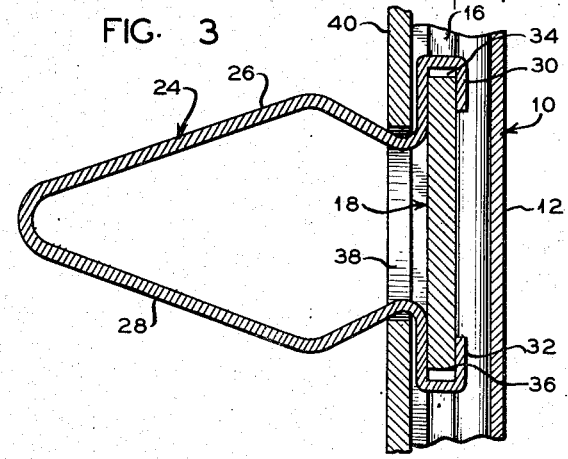
FIG. 3
INVENTOR.
C. D. WEST
BY
A. Yates Dowell
ATTORNEY Nov. 24, 1953  C. D. WEST  2,659,950
TRIM MOLDING FASTENING MEANS AND METHOD
Filed Aug. 14, 1950  3 Sheets-Sheet 2

INVENTOR.
C. D. WEST
BY
A. Yates Dowell
ATTORNEY

Nov. 24, 1953 C. D. WEST 2,659,950
TRIM MOLDING FASTENING MEANS AND METHOD
Filed Aug. 14, 1950 3 Sheets-Sheet 3

INVENTOR.
C. D. WEST
BY
A. Yates Dowell
ATTORNEY

Patented Nov. 24, 1953

2,659,950

UNITED STATES PATENT OFFICE 2,659,950

TRIM MOLDING FASTENING MEANS AND METHOD

Charles D. West, Orlando, Fla.

Application August 14, 1950, Serial No. 179,126

5 Claims. (Cl. 24—73)

This invention relates to ornamentation and more particularly to universal fastening means for detachably securing trim molding to any supporting structure such as the body of a vehicle, a building, or any other desired object, and also to the tools and the method employed in assembling the fastening means and applying the trim molding to a supporting structure.

Heretofore, numerous devices have been developed for a similar purpose, but these were specifically designed for use only with certain types of molding or were of such construction that they did not provide a tight and secure fastening for the various types of moldings with which they could be used. Furthermore, they were difficult to attach to the molding and to the supporting structure, were costly to manufacture, and required the maintenance of relatively large inventory of various types of clips for use with different types of molding.

One object of the present invention is the provision of a fastener consisting of a plurality of individual elements which may be assembled in different manners to accommodate substantially all types of molding in common use.

A further object of this invention is to provide fastening means, the several parts of which may be economically fabricated from sheet metal stampings and which may be readily assembled and attached to conventional trim moldings by relatively simple manual operations.

Another object of the present invention is the provision of suitable tools for use in conjunction with the several parts of the novel fastener to facilitate assembly of the parts and application of the molding to a supporting structure having suitable openings.

A still further object of this invention is to provide a novel method of forming and assembling the parts of the novel fastening means and of attaching the molding thereby to a supporting structure provided with suitable openings such as the body of an automobile.

Figure 6:
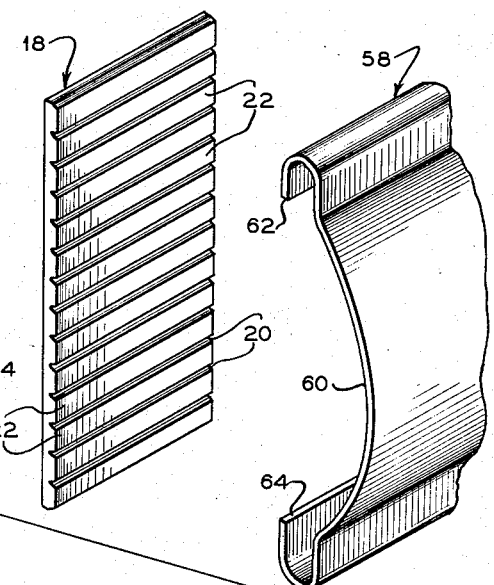
Figure 6:
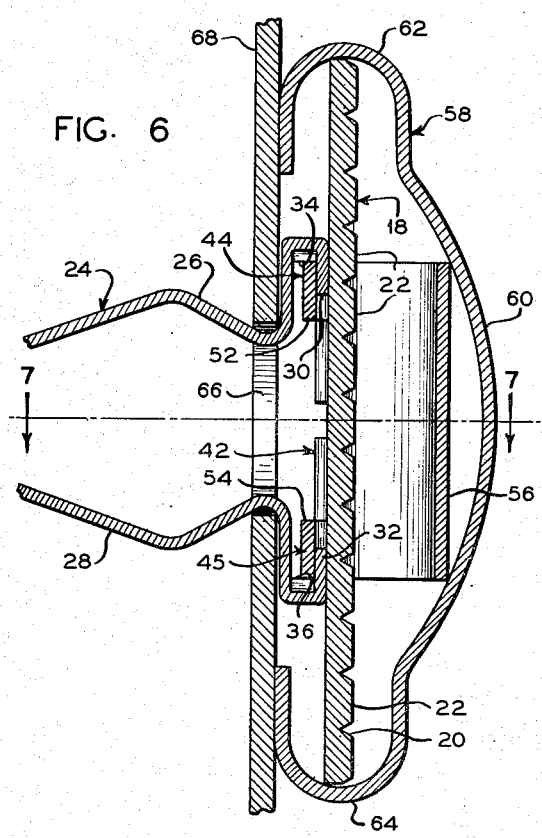
Figure 7:
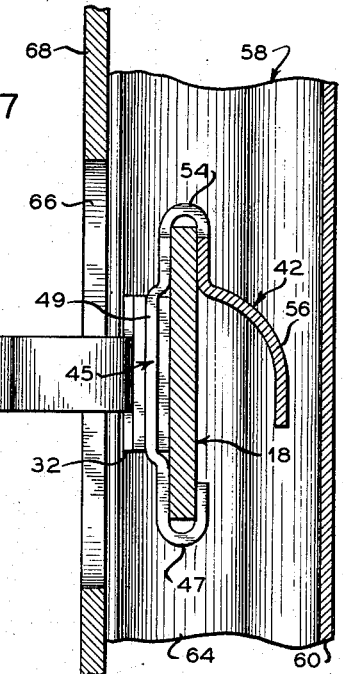
Figure 8:
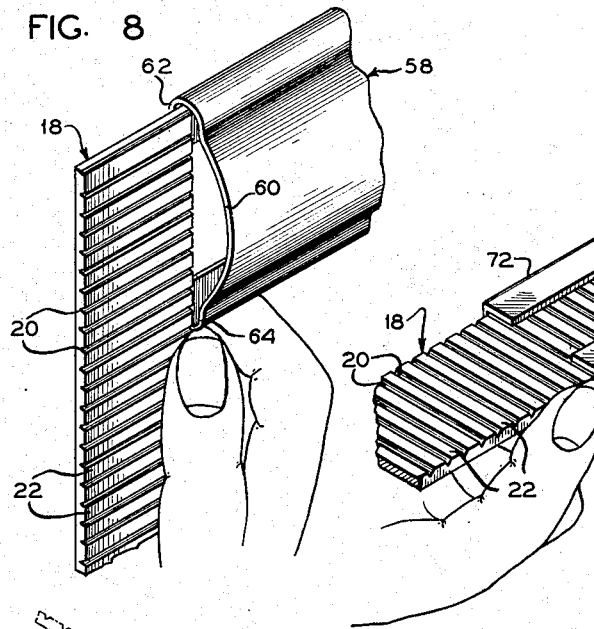
Figure 9:
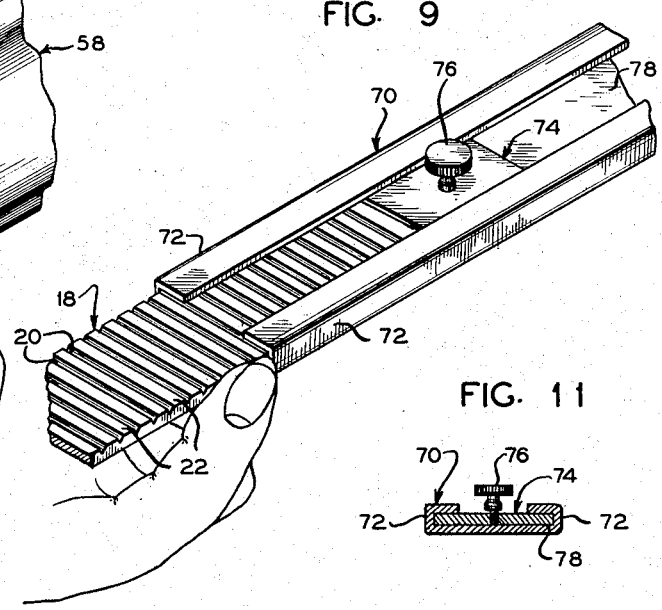
Figure 11:
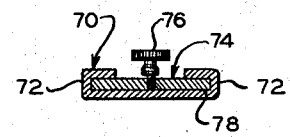
Figure 10:
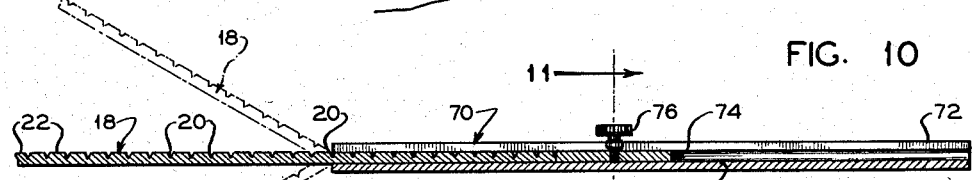
Figure 14:
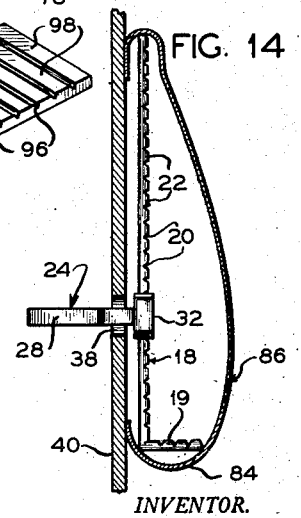
Figure 15:
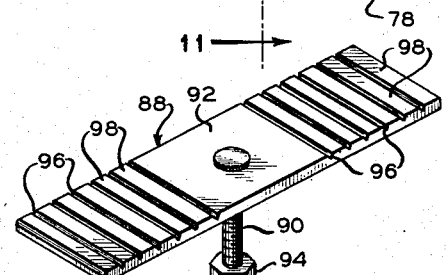
Figure 13:
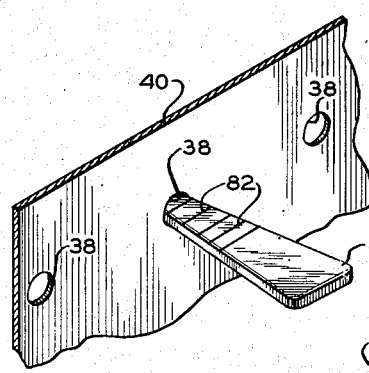
Figure 12:
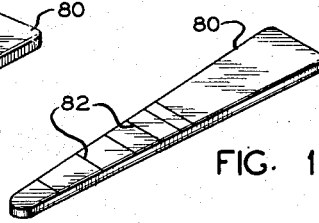

Further objects and advantages of the invention will be apparent from the following description taken in conjunction with the drawings, wherein:

Fig. 1 is an exploded perspective view showing one preferred form of fastening means constituting a part of the present invention and a section of trim molding for use in conjunction therewith;

Fig. 2, a fragmentary sectional view on an enlarged scale showing the fastening means of Fig. 1 assembled with a strip of molding and attached to a supporting structure;

Fig. 3, a sectional view taken on line 3—3 of Fig. 2;

Fig. 4, a sectional view taken on line 4—4 of Fig. 2;

Fig. 5, an exploded perspective view of another form of fastening means, similar to the preferred form show in Figs. 1-4, but including an adapter clip for use on certain applications;

Fig. 6, a fragmentary sectional view on an enlarged scale showing the fastening means of Fig. 5 assembled with a strip of molding and attached to a supporting structure;

Fig. 7, a sectional view taken on line 7—7 of Fig. 6;

Fig. 8, a perspective view illustrating one step in the method of forming and assembling the parts of the fastener and more specifically shows the step of measuring the necessary length of base strip for a particular piece of molding;

Fig. 9, a perspective view of another step wherein the base strip is positioned in a novel breaking tool and the tool is set for breaking off any number of pieces of base strip to the proper length;

Fig. 10, a sectional view illustrating the further step of breaking off a section of base strip;

Fig. 11, a sectional view on line 11—11 of Fig. 10;

Fig. 12, a perspective view of a hole gauge used in connection with the present invention;

Fig. 13, a perspective view illustrating the use of the hole gauge for determining the size of the holes in the supporting structure;

Fig. 14, a sectional view illustrating another manner of forming and applying the fastening means of the present invention, as shown in Fig. 1, to a somewhat different type of molding; and Fig. 15, a perspective view of a modified form of fastening means wherein the base strip has a threaded fastener attached thereto at an intermediate point and the end portions only are notched.

Referring now to the drawings in detail, the various elements of one preferred form of fastening means are shown in Figs. 1, 2, 3 and 4 with a portion of a strip of molding 10 having an arcuate intermediate portion 12 and opposed U-shaped portions 14 and 16 integrally connected therewith.

A base strip 18 may be fabricated of any suitable ductile and frangible material and in any convenient stock lengths, and consists of a long flat strip provided with weakened transverse lines which preferably may be in the form of notches or grooves 20 at uniform intervals to form a plurality of segments 22.

A spring clip 24 formed of resilient material such as spring steel is provided with a pair of angularly disposed and integrally connected bowed arms 26 and 28 which diverge outwardly for a substantial distance and then converge adjacent their outer ends. A pair of opposed U-shaped jaws 30 and 32 are integrally connected to each of the outer end portions of the arms 26 and 28 and are provided with biting edges 34 and 36 for a purpose to be described hereinafter.

This form of fastening means is assembled with a molding strip by breaking away a portion of the base strip 18 along one of the notches 20 in a manner to be described subsequently in order to provide a section consisting of a plurality of segments 22 whose overall length is slightly less than the distance between the portions 14 and 16. A clip 24 is slipped over the section of the base strip 18 with the jaws 30 and 32 pressed into firm engagement therewith, so that the biting edges 34 and 36 firmly engage in the material of the base strip. A plurality of units thus assembled are slid endwise into the molding strip and spaced in accordance with the openings in the supporting structure.

As shown in Fig. 2, the clip 24 may be forced through an opening 38 in a supporting wall 40 and the arms 26 and 28, due to their resiliency, firmly engage the edges of the opening to securely hold the molding strip 12 in position. The spring action of the clips 24 engaging in the openings 38 force the edges 34 and 36 to bite into the material of the base strip, as shown in Fig. 4.

It will be obvious that by providing a relatively few different sizes of the clips 24, the fastening means of the present invention may be adapted for use with substantially any conventional type of molding strip, since the base strip 18 may be broken off to the proper length to accommodate different widths of molding. It will only be necessary to provide clips 24 in a few different sizes to engage the various sizes of openings.

The fastening means shown in Fig. 5 is substantially identical with that shown in Fig. 1 except for the further provision of an adapter clip 42 which provides for the arrangement of clip 24 at substantially right angles to the position shown in Fig. 1 with relation to the molding strip. Whereas the arrangement shown in Fig. 1 is adapted for use with round holes or with clips 24 crosswise in large elongated openings in the supporting structure extending transversely of the molding strip, the adapter clip 42 is used in conjunction with clips 24 crosswise in large elongated openings in the supporting structure which extend longitudinally of the molding strip. Of course the clips 24 can also be inserted lengthwise in narrow elongated openings which are not too long for the span between arms 26 and 28.

The adapted clip 42 is provided with a pair of spaced parallel arms 44 and 45 each provided with U-shaped end portions 46 and 47. The arms 44 and 45 each has an outwardly offset portion 48 and 49 respectively, and are integrally connected by U-shaped portions 52 and 54 with an arcuate flange 56 which is bowed outwardly away from the arms 44 and 46 and is adapted to engage against the inner surface of the molding strip and prevent relative movement due to vibration.

In the use of this modified form of fastening means a portion of the base strip 18 is broken off to a suitable length and inserted in the adapter clip between the U-shaped ends 48 and 50 and the U-shaped portions 52 and 54. The arms 26 and 28 are spread sufficiently for the jaws 30 and 32 to engage over the outer edges of the arms 44 and 46 with the biting edges 34 and 36 engaging therewith, as shown in Fig. 6. This assembly is slid lengthwise into the molding strip 58 which has been shown slightly different in cross section than the molding strip 10, but is likewise provided with an arcuate portion 60 and opposed U-shaped portions 62 and 64.

The clip 24 is inserted through the opening 66 in the supporting wall 68. There is a slight binding effect which firmly holds the adapter clip 42 in engagement with the section of the base strip 18 and the arcuate flange 56 binds against the curved portion 60 of the molding strip 58 to substantially prevent any relative movement between the various elements which might normally be caused by vibration.

In forming and assembling the fastener in accordance with the present invention the stock length of base strip 18 is held up against one end of the piece of molding strip 58 to be attached to a supporting structure, and the strip is marked with the thumb nail, as shown in Fig. 8, where it should be broken to provide a section of base strip of proper length to fit snugly within the molding.

The base strip is next inserted in the breaking tool 70 with the thumb nail against one of the L-shaped side flanges 72, and the slidable gauge 74 is moved into contact with the end of the base strip 18 and locked in position by means of set screw 76, which engages the bottom wall 78 of the breaking tool 70, as shown in Figs. 9 and 11.

By pulling up and pushing down on the protruding end of the base strip 18, the section of the desired length may be broken off along the notch 20 adjacent the end of the breaking tool 70, as shown in Fig. 10.

A plurality of sections of base strip 18 of the proper length may then be readily formed by slipping the stock length of base strip 18 into the breaking tool against gauge 74 and breaking off the strip along one of the notches 20.

The next step involves the use of the tapered hole gauge 80, shown in Fig. 12, which is provided with a plurality of transverse markings 82 which may have indicia associated therewith indicating the width of the gauge at that point.

By inserting the gauge in one of the openings 38 in the supporting wall 40 the size of the opening may be determined readily and a clip 24 selected which fits the opening. The clips 24 must be accurately formed and dimensioned for each size opening to give optimum results. When they are of the proper shape and dimensions they will snap home with a sharp audible click and securely hold the molding in firm tight engagement with the supporting wall.

If the clips 24 are too small, the molding will be loose, and if they are too large, the spring material will snap in two.

Fig. 14 illustrates another slightly modified manner of using the basic elements of the fastening means of the present invention, wherein one end portion 19 of the base strip 18 is bent at an angle to engage firmly in the relatively wide lower portion 84 of a strip of molding 86. In this application of the fastening means the clip 24 is substantially offset from the center of the base strip 18.

Since the clips 24 resiliently engage and bite into the base strip 18 they can be readily positioned in any desired relation to the molding either centrally or offset to any degree. This feature is particularly desirable when replacing trim molding, since frequently the openings in the body will not align with openings in the door. By slightly offseting the clips 24 on the base strip 18 the molding itself may be made to align perfectly on different parts of the automobile.

Another slightly modified form of the present invention is shown in Fig. 15 wherein a base strip 88 has a threaded fastening element 90 secured to an intermediate portion 92 which is preferably not notched. The threaded member 90 may be formed integrally with the base strip 88 or may be riveted or otherwise secured thereto and is provided with a nut 94. The end portions of the base strip 88 are notched at 96 to provide a plurality of segments 98 which may be broken off in the breaking tool 70 in the same manner as base strip 18 to fit any width of molding. This form may be desirable in certain applications where a threaded fastener may be readily used, and provides a somewhat more secure fastening which may be used at the ends of each strip of molding.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. The method of applying flanged trim molding to a supporting structure provided with suitable spaced openings by fastening means having a frangible base strip with a spring clip attached thereto, said method comprising the steps of breaking off a section of base strip substantially no longer than the width between the flanges of the trim molding, bending at least one end portion of the base strip, determining the size of the openings, selecting a plurality of spring clips of the proper size to fit the openings, attaching each of the spring clips to one of the sections of base strip, inserting each base strip in spaced relation within the flanges of the trim molding, and snapping each of the spring clips into one of the openings for securely holding the trim molding in position on the supporting structure.

2. A fastener for attaching trim material of the character having spaced opposed flange portions and an intermediate face portion to a main body provided with one or more apertures, said fastener comprising an adapter formed from ductile sheet material and including a substantially flat member having a plurality of spaced serrations transversely of its length whereby the length of said flat member may be reduced if necessary to be received between the flange portions of said trim material, and a substantially U-shaped spring clip receivable in one of the apertures in said main body, said clip having a pair of outwardly bowed integrally connected and angularly disposed arms, the free extremities of said arms being provided with opposed U-shaped jaws for embracing the longitudinal edges of said arms being provided with opposed U-plane perpendicular to the plane of said angularly disposed arms and each jaw having inwardly directed biting edges for biting into the ductile material of said adapter to prevent displacement of said spring clip on said adapter when said angularly disposed arms are engaged within an aperture in said main body.

3. A fastener for attaching trim material of the character having spaced opposed flange portions and an intermediate face portion to a main body provided with one or more apertures, said fastener comprising a substantially flat member formed from ductile sheet material having a plurality of spaced serrations transversely of its length whereby its length may be reduced if necessary to be received between the flange portions of said trim material, an adapter clip formed from ductile sheet material, the rear portion of said adapter clip comprising a pair of spaced arms the extremities of which terminate in opposed U-shaped portions for snugly embracing the longitudinal edges of said flat member, the intermediate portion of each of said spaced arms being offset rearwardly from the plane of said U-shaped portions, the forward portion of said adapter clip comprising a resilient arcuate and outwardly bowed flange having a free edge for frictional engagement with the inner surface of the face portion of said trim material, and a substantially U-shaped spring clip receivable in one of the apertures in said main body, said clip having a pair of outwardly bowed integrally connected and angularly disposed arms, the free extremities of said arms being provided with opposed U-shaped jaws for embracing the longitudinal outer edges of the offset portions of the spaced arms on said adapter clip, said jaws being disposed in a plane perpendicular to that of said angularly disposed arms and each jaw having inwardly extending biting edges adjacent opposite ends thereof for biting into the ductile material of said adapter clip to prevent displacement of said spring clip on said adapter clip when said spring clip is engaged with an aperture in said main body.

4. A fastener for attaching trim material of the character having spaced opposed flange portions to a main body provided with one or more apertures, said fastener comprising a substantially flat member formed from ductile sheet material having a plurality of spaced serrations transversely of its length defining portions joined by weakened sections whereby its length may be reduced if necessary to be received between the flange portions of the trim material, and a substantially U-shaped spring clip receivable in one of said apertures, said clip having a pair of outwardly bowed integrally connected and angularly disposed arms, the free extremities of said arms being provided with opposed U-shaped jaws for embracing opposite longitudinal edges of said flat member, said jaws being disposed in a plane perpendicular to that of said angularly disposed arms and each jaw having inwardly extending biting edges adjacent opposite ends thereof for biting into the ductile material of said flat member to prevent longitudinal displacement of said spring clip on said flat member when said clip is engaged with said aperture.

5. A fastener for attaching trim material of the character having spaced opposed flanges to a main body provided with one or more apertures, said fastener comprising a substantially flat member formed from ductile sheet material the extremities of which are received between the flanges of said trim material, and a substantially U-shaped spring clip receivable in an aperture in said main body, said clip having a pair of outwardly bowed integrally connected and angularly disposed arms, the free extremities of said arms being provided with opposed U-shaped jaws for embracing opposite longitudinal edges of said flat member, said jaws being disposed in a plane perpendicular to the plane of said angularly disposed arms, each jaw having inwardly directed biting edges adjacent opposite ends thereof for biting into the ductile material of said flat member to prevent longitudinal displacement of said spring clip on said flat member when said clip is engaged in an aperture in said main body.

CHARLES D. WEST.

References Cited in the file of this patent

UNITED STATES PATENTS

| Number | Name | Date |
|---|---|---|
| 1,511,746 | Noll | Oct. 14, 1924 |
| 2,086,288 | Van Uum | July 6, 1937 |
| 2,111,357 | Cornell, Jr. | Mar. 15, 1938 |
| 2,127,618 | Riemenschneider | Aug. 23, 1938 |
| 2,207,374 | Fernberg | July 9, 1940 |
| 2,287,606 | Eady | June 23, 1942 |
| 2,334,940 | Le Tourneau | Nov. 23, 1943 |
| 2,418,958 | Stock | Apr. 15, 1947 |
| 2,540,396 | Krach | Feb. 6, 1951 |
| 2,557,773 | Steinman | June 19, 1951 |